United States Patent
Hamada et al.

(10) Patent No.: US 9,557,085 B2
(45) Date of Patent: Jan. 31, 2017

(54) HEAT PUMP APPARATUS

(75) Inventors: Mamoru Hamada, Chiyoda-ku (JP);
Fumitake Unezaki, Chiyoda-ku (JP);
Yoshihiro Takahashi, Chiyoda-ku (JP);
Kengo Takahashi, Chiyoda-ku (JP);
Kazuki Okada, Chiyoda-ku (JP);
Hirokazu Minamisako, Chiyoda-ku (JP); Shinichi Uchino, Chiyoda-ku (JP)

(73) Assignee: MITSUBISHI ELECTRIC CORPORATION, Chiyoda-ku, Tokyo (JP)

( * ) Notice: Subject to any disclaimer, the term of this patent is extended or adjusted under 35 U.S.C. 154(b) by 1013 days.

(21) Appl. No.: 13/384,680

(22) PCT Filed: Jan. 15, 2010

(86) PCT No.: PCT/JP2010/050421
§ 371 (c)(1),
(2), (4) Date: Jan. 18, 2012

(87) PCT Pub. No.: WO2011/010473
PCT Pub. Date: Jan. 27, 2011

(65) Prior Publication Data
US 2012/0111042 A1    May 10, 2012

(30) Foreign Application Priority Data
Jul. 22, 2009    (JP) .................................. 2009-170698

(51) Int. Cl.
*F25D 21/06* (2006.01)
*F25B 47/00* (2006.01)
(Continued)

(52) U.S. Cl.
CPC ............. *F25B 47/025* (2013.01); *F25B 49/02* (2013.01); *F24F 2011/0087* (2013.01);
(Continued)

(58) Field of Classification Search
CPC ..... F25B 47/02; F25B 47/022; F25B 2600/23; F25B 2313/02741; F25B 30/02; F25B 13/00; F25B 2313/02323; F25B 2313/02322; F25B 2314/0662; F25B 2400/0411; F25B 2600/2513; F25B 41/062; F25B 2314/064; F25B 2600/02; F25B 2600/0253; F25B 2700/171; F25B 49/025; F25B 47/025; F25B 43/00; F25B 43/006; F25B 2400/16; F25D 21/00; F25D 21/04
(Continued)

(56) References Cited

U.S. PATENT DOCUMENTS 5,349,826 A * 9/1994 Kawai et al. .................... 62/133
5,704,217 A * 1/1998 Itoh et al. ........................ 62/150
(Continued)

FOREIGN PATENT DOCUMENTS

DE    19832682 A1 *  1/2000  ............ F25B 47/025
EP    1967801 A2     9/2008
(Continued)

OTHER PUBLICATIONS

Office Action (Notice of Rejection) dated Aug. 21, 2012, issued in corresponding Japanese Patent Application No. 2011-523565 and an English Translation thereof. (4 pages).
(Continued)

*Primary Examiner* — Henry Crenshaw
(74) *Attorney, Agent, or Firm* — Buchanan Ingersoll & Rooney PC

(57) ABSTRACT

In a heat pump apparatus, it is aimed to enhance efficiency of a defrost operation by reducing a loss of heat radiation during the defrost operation and reducing a compressor input during the defrost operation. The heat pump apparatus includes a main refrigerant circuit in which a compressor, a
(Continued)

first heat exchanger, an expansion mechanism, and a second heat exchanger are connected sequentially, and also includes a bypass circuit including an on-off valve and providing a connection by bypassing the expansion mechanism. The main refrigerant circuit includes a four-way valve that switches between a heating operation and the defrost operation by switching an order in which the refrigerant circulates through the main refrigerant circuit. The main refrigerant circuit also includes a first temperature detection unit and a second temperature detection unit. Based on values detected by these temperature detection units, a degree of superheat of the first heat exchanger during the defrost operation is computed. When the heating operation is switched to the defrost operation, the heat pump apparatus increases a circulation amount of the refrigerant circulating through the refrigerant circuit by opening the on-off valve, and also controls an operation frequency of the compressor such that the degree of superheat is at a predetermined target value.

5 Claims, 15 Drawing Sheets

(51) Int. Cl.
*F25B 13/00* (2006.01)
*F25B 47/02* (2006.01)
*F25B 49/02* (2006.01)
*F24F 11/00* (2006.01)

(52) U.S. Cl.
CPC ....... *F25B 13/00* (2013.01); *F25B 2400/0411* (2013.01); *F25B 2600/01* (2013.01); *F25B 2600/021* (2013.01); *F25B 2600/2501* (2013.01); *F25B 2600/2513* (2013.01); *F25B 2600/2521* (2013.01); *F25B 2700/21151* (2013.01); *F25B 2700/21163* (2013.01); *Y02B 30/741* (2013.01)

(58) Field of Classification Search
USPC ........... 62/81, 151, 155, 158, 160, 197, 222, 225, 62/228.1, 228.4, 234, 324.1, 324.5, 503, 509
See application file for complete search history.

(56) References Cited

U.S. PATENT DOCUMENTS

| 6,109,533 | A | 8/2000 | Ao et al. | |
|---|---|---|---|---|
| 7,536,867 | B2* | 5/2009 | Kaga et al. | 62/227 |
| 7,730,729 | B2* | 6/2010 | Yakumaru et al. | 62/155 |
| 8,136,364 | B2* | 3/2012 | Lifson et al. | 62/197 |
| 8,171,747 | B2* | 5/2012 | Kurihara et al. | 62/222 |
| 2004/0107715 | A1* | 6/2004 | Lee et al. | 62/223 |
| 2004/0211202 | A1 | 10/2004 | Katogi et al. | |
| 2005/0257558 | A1* | 11/2005 | Yoshioka et al. | 62/324.5 |
| 2007/0274020 | A1 | 11/2007 | Park et al. | |

FOREIGN PATENT DOCUMENTS

| GB | 2 130 747 A | 6/1984 |
|---|---|---|
| JP | 59-23067 U | 2/1984 |
| JP | 61-36659 A | 2/1986 |
| JP | 61-46848 A | 3/1986 |
| JP | 64-70669 A | 3/1989 |
| JP | 1-127873 A | 5/1989 |
| JP | 5-302771 A | 11/1992 |
| JP | 05-302771 A | 11/1993 |
| JP | 06-026713 A | 2/1994 |
| JP | 2002-327949 A | 11/2002 |
| JP | 2004-205194 A | 7/2004 |
| JP | 2007-033002 A | 2/2007 |
| JP | 2007-33002 A | 2/2007 |
| JP | 2007-051805 A | 3/2007 |
| JP | 2007-515805 A | 6/2007 |
| JP | 2008-224088 A | 9/2008 |

OTHER PUBLICATIONS

First Office Action issued on Aug. 19, 2013, by the Chinese Patent Office in corresponding Chinese Patent Application No. 201080033234.6, and an English Translation of the Office Action. (11 pages).
International Search Report (PCT/ISA/210) issued on Feb. 9, 2010, by Japanese Patent Office as the International Searching Authority for International Application No. PCT/JP2010/050421.
The Extended European Search Report issued on May 22, 2014, by the European Patent Office in corresponding European Patent Application No. 10802094.2-1602. (6 pages).

* cited by examiner

_US 9,557,085 B2_

HEAT PUMP APPARATUS

TECHNICAL FIELD

This invention relates to a technique for efficiently performing a defrost operation in a heat pump apparatus, such as a heat pump water heater, for example.

BACKGROUND ART

In a heat pump air conditioner, frost may be formed on a heat exchanger of an outdoor unit during a heating operation. There exists a heat pump air conditioner that performs a defrost operation for removing frost formed on a heat exchanger of an outdoor unit during a heating operation. During this defrost operation, it is a general practice to have a refrigerant flow in a reverse direction as compared to the heating operation, such that defrosting is performed by heat radiated when a high-temperature and high-pressure gas refrigerant discharged from a compressor condenses at the heat exchanger of the outdoor unit.

Patent Literature 1 discusses a configuration of an expansion mechanism such that a flow path resistance during a defrost operation is lower than a flow path resistance during a normal cooling or heating operation. With this arrangement, a sufficient flow volume of the refrigerant can be secured for melting frost, so that an efficient defrost operation is realized and a defrost operation time is shortened.

Patent Literature 2 discusses a defrost operation in a water heater. In particular, Patent Literature 2 discusses adjustment of a circulation amount of a refrigerant during the defrost operation based on the temperature of water, i.e. a heat source. With this arrangement, efficiency is enhanced by shortening a defrost operation time depending on the temperature of water, and reliability is enhanced by preventing a liquid backflow to a compressor. A liquid backflow means that the refrigerant in a liquid phase flows into the compressor.

CITATION LIST

Patent Literature
[Patent Literature 1] JP 61-036659 A
[Patent Literature 2] JP 61-046848 A

DISCLOSURE OF INVENTION

Technical Problem

As discussed in Patent Literature 1, during the defrost operation, when the circulation amount of the refrigerant is increased by reducing the flow path resistance of the expansion mechanism, the circulation amount of the refrigerant may become too large for the quantity of heat taken from the heat source. If the circulation amount of the refrigerant becomes too large for the quantity of heat taken from the heat source, a liquid backflow to the compressor occurs. As a result, a compressor input may be increased, and a failure may occur in the compressor.

In actuality, in an air conditioner, it is a general practice to stop a blower at a heat source side during a defrost operation. For this reason, a sufficient quantity of heat is not taken at the heat source and a liquid backflow is likely to occur.

As discussed in Patent Literature 2, in the water heater, when the circulation amount of the refrigerant during the defrost operation is adjusted depending on the temperature of water, i.e. the heat source, efficiency may be adversely affected by a loss of heat radiation due to an increased discharge temperature of the compressor, and by an increased compressor input due to an increased difference between high and low pressures.

It is an object of this invention to enhance efficiency of a defrost operation by reducing a loss of heat radiation during the defrost operation and reducing a compressor input during the defrost operation, for example.

Solution to Problem

A heat pump apparatus according to this invention includes, for example:

a refrigerant circuit in which a compressor, a first heat exchanger, an expansion mechanism, and a second heat exchanger are connected sequentially;

a switching unit that switches between a heating operation and a defrost operation such that during the heating operation a refrigerant circulates through, in order, the compressor, the first heat exchanger, the expansion mechanism, and the second heat exchanger, and during the defrost operation the refrigerant circulates through, in order, the compressor, the second heat exchanger, the expansion mechanism, and the first heat exchanger;

a superheat detection unit that detects a degree of superheat of the refrigerant at the first heat exchanger during the defrost operation; and a control unit that, when the heating operation is switched to the defrost operation by the switching unit, increases a circulation amount of the refrigerant circulating through the refrigerant circuit, and controls an operating frequency of the compressor such that the degree of superheat detected by the superheat detection unit is at a target value which is predetermined.

In this invention, during a defrost operation, a circulation amount of a refrigerant is increased and an operating frequency of a compressor is reduced, thereby preventing a discharge temperature from rising so that a loss of heat radiation is reduced, and also reducing a compressor input. As a result, an efficient defrost operation can be performed.

DESCRIPTION OF EMBODIMENTS

First Embodiment

Figure 1:
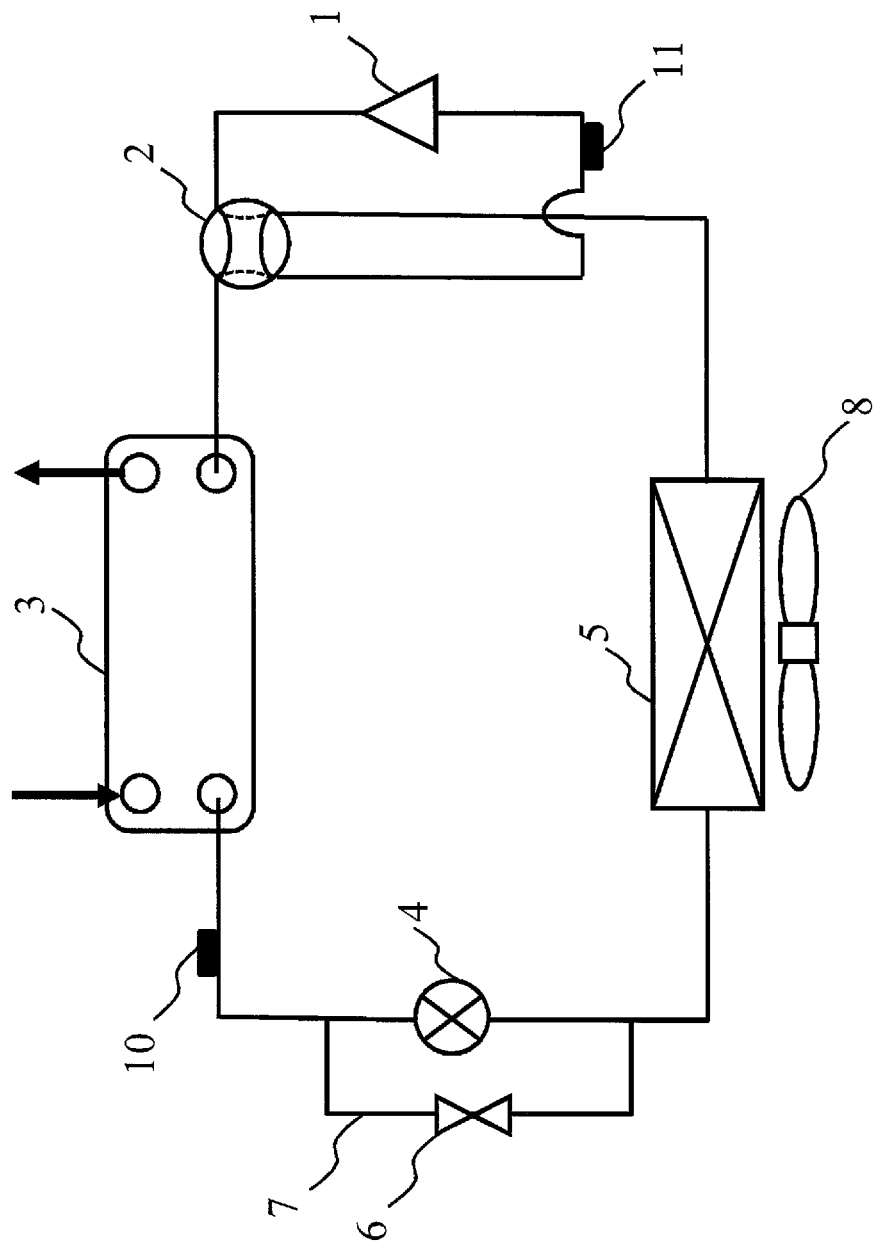
FIG. 1 is a configuration diagram of a refrigerant circuit of a heat pump water heater according to a first embodiment.
Figure 2:
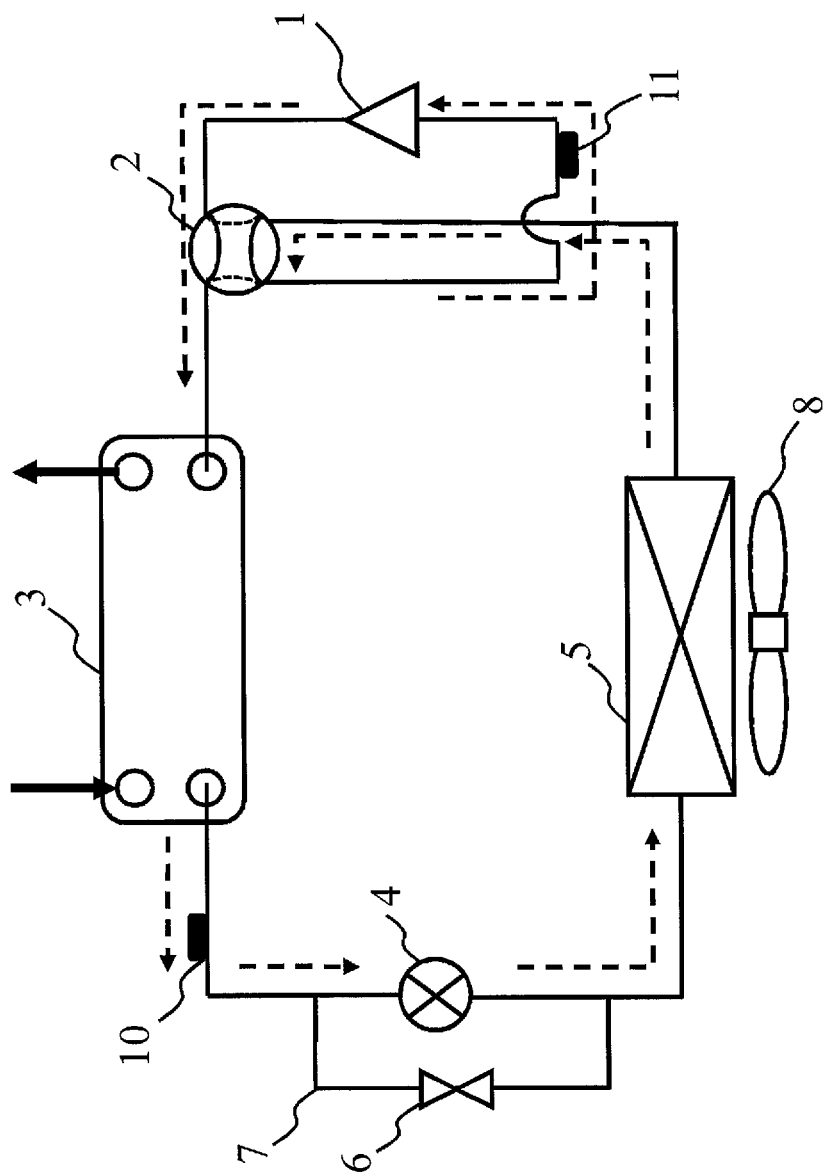
FIG. 2 is a diagram showing flows of a refrigerant in the refrigerant circuit shown in FIG. 1 during a heating operation.
Figure 3:
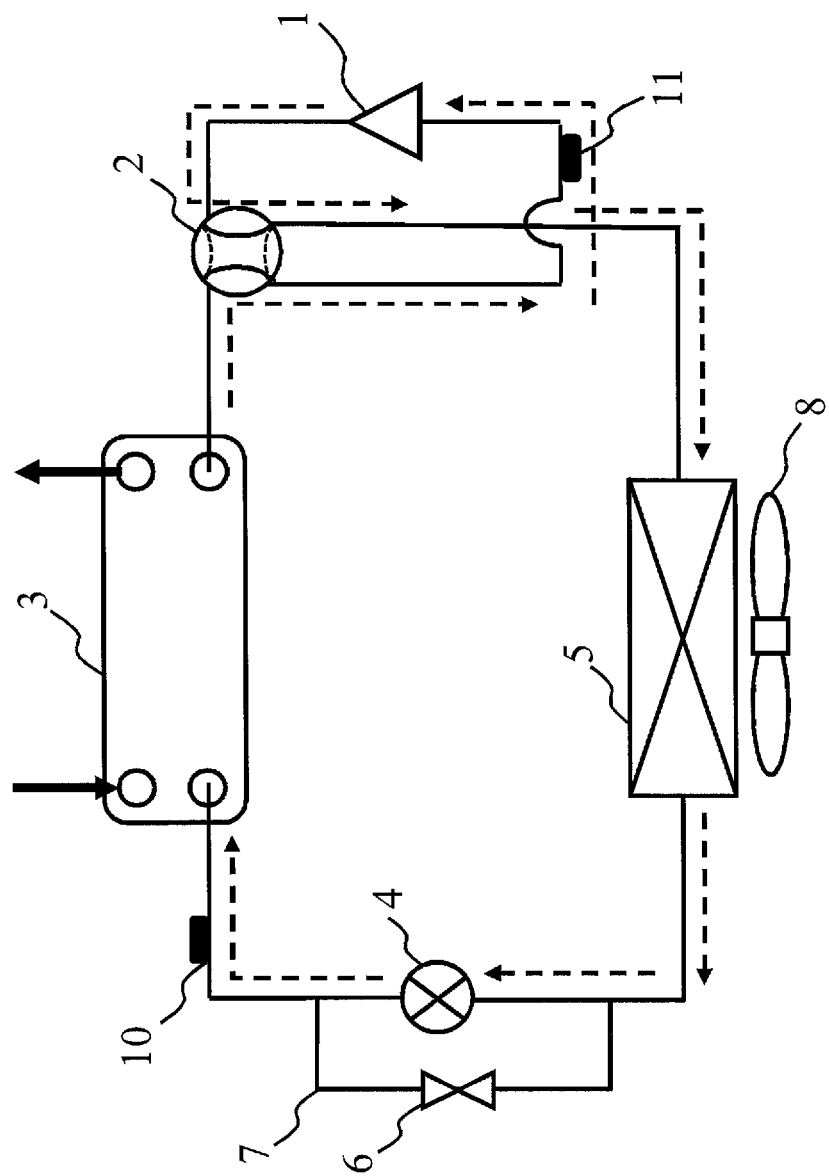
FIG. 3 is a diagram showing flows of a refrigerant in the refrigerant circuit shown in FIG. 1 during a defrost operation.

FIG. 1 is a configuration diagram of a refrigerant circuit of a heat pump water heater according to a first embodiment. FIG. 2 is a diagram showing flows of a refrigerant in the refrigerant circuit shown in FIG. 1 during a heating operation. FIG. 3 is a diagram showing flows of the refrigerant in the refrigerant circuit shown in FIG. 1 during a defrost operation. In FIGS. 2 and 3, a dashed arrow indicates a flow of the refrigerant, and a solid arrow indicates a flow of water.

The heat pump water heater includes a main refrigerant circuit in which a compressor 1, a first heat exchanger 3, an expansion mechanism 4, and a second heat exchanger 5 are sequentially connected by pipes. The main refrigerant circuit includes a four-way valve 2 (an example of a switching unit) at a discharge outlet side of the compressor 1. A fan 8 to be used for heat exchange is provided at the second heat exchanger 5.

The heat pump water heater includes a bypass circuit 7 that connects a midpoint between the first heat exchanger 3 and the expansion mechanism 4 with a midpoint between the expansion mechanism 4 and the second heat exchanger 5 of the main refrigerant circuit such that the expansion mechanism 4 is bypassed. The bypass circuit 7 includes an on-off valve 6.

Further, on the main refrigerant circuit, a first temperature detection unit 10 is provided between the first heat exchanger 3 and the expansion mechanism 4, and a second temperature detection unit 11 is provided between the four-way valve 2 and the compressor 1. In particular, the first temperature detection unit 10 is provided between the first heat exchanger 3 and a connection point of the bypass circuit 7 between the first heat exchanger 3 and the expansion mechanism 4. The first temperature detection unit 10 and the second temperature detection unit 11 are examples of a superheat detection unit.

The heat pump water heater further includes a control unit (not illustrated) that controls overall operations. The control unit is a computer such as a microcomputer, for example.

As described above, the heat pump water heater is discussed herein as an example of a heat pump apparatus. Thus, it is assumed that the first heat exchanger 3 is a heat exchanger that heat-exchanges the refrigerant with water for hot-water supply, and the second heat exchanger 5 is a heat exchanger that heat-exchanges the refrigerant with air. In other words, during the heating operation, the refrigerant heats the water by absorbing heat from the air at the second heat exchanger 5 and radiating the heat to the water at the first heat exchanger 3. That is, the term heating (heating operation) herein not only refers to heating of an interior of a building or a room but also includes heating of water.

As shown in FIG. 2, during the heating operation, the control unit sets the four-way valve 2 such that the refrigerant circulates through, in order, the compressor 1, the first heat exchanger 3, the expansion mechanism 4, and the second heat exchanger 5. The control unit keeps the on-off valve 6 closed during the heating operation.

That is, the refrigerant in a high-temperature and high-pressure gas state discharged from the compressor 1 passes through the four-way valve 2 and flows into the first heat exchanger 3. The gas refrigerant that has flowed into the first heat exchanger 3 radiates heat to the water, thereby condensing into a liquid refrigerant, and then flows into the expansion mechanism 4. The refrigerant that has flowed into the expansion mechanism 4 is pressure-reduced into a gas-liquid two-phase refrigerant, and then flows into the second heat exchanger 5. The gas-liquid two-phase refrigerant that has flowed into the second heat exchanger 5 absorbs heat from the air, thereby turning into a low-pressure gas refrigerant, and then returns to the compressor 1.

During the heating operation, when the temperature of the refrigerant is at or below 0 degrees Celsius and at or below the dew point of the air, moisture contained in the air adheres to the second heat exchanger 5 and forms frost, that is, frost formation occurs. The frost formed on the second heat exchanger 5 acts as a thermal resistance in heat exchange between the air and the refrigerant, or as an air flow resistance which interferes with a flow of the air such as an air current caused by the fan 8. That is, the frost formed on the second heat exchanger 5 reduces the amount of heat exchange. For this reason, if frost formation occurs to a certain extent, a defrost operation must be performed to remove the frost.

As shown in FIG. 3, during the defrost operation, it is a general practice to switch the four-way valve 2 such that a flow direction of the refrigerant is reversed as compared the heating operation. That is, during the defrost operation, the control unit sets the four-way valve 2 such that the refrigerant circulates through, in order, the compressor 1, the second heat exchanger 5, the expansion mechanism 4, and the first heat exchanger 3. It is assumed herein that the on-off valve 6 is closed.

That is, the refrigerant in a high-temperature and high-pressure gas state discharged from the compressor 1 passes through the four-way valve 2 and flows into the second heat exchanger 5. The gas refrigerant that has flowed into the second heat exchanger 5 radiates heat, thereby melting the frost and condensing into a liquid refrigerant, and then flows into the expansion mechanism 4. The refrigerant that has flowed into the expansion mechanism 4 is pressure-reduced into a gas-liquid two-phase refrigerant. The gas-liquid two-phase refrigerant absorbs heat from the water at the first heat exchanger 3, thereby turning into a low-pressure gas refrigerant, and then returns to the compressor 1. During the defrost operation, the fan 8 is at rest.

Figure 4:
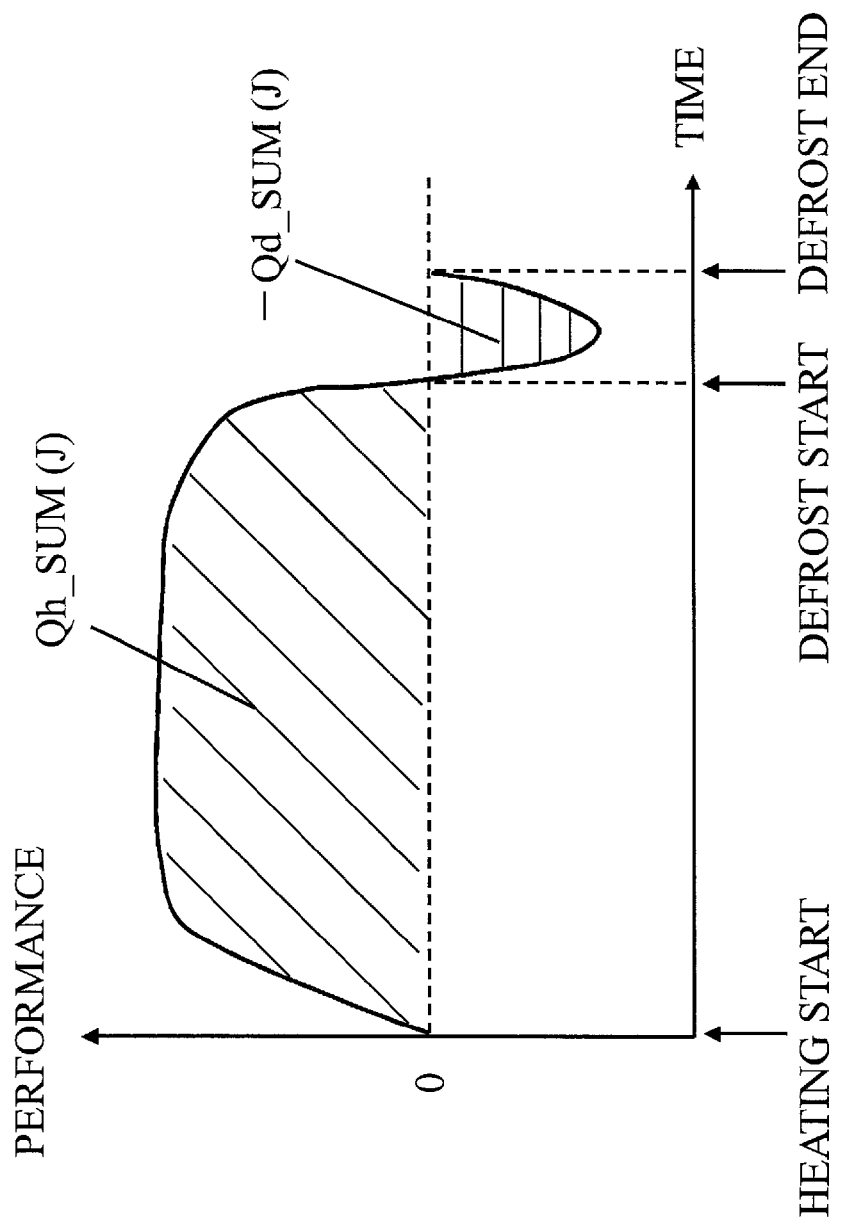
FIG. 4 is a diagram showing changes in performance from start of the heating operation to end of the defrost operation.
Figure 5:
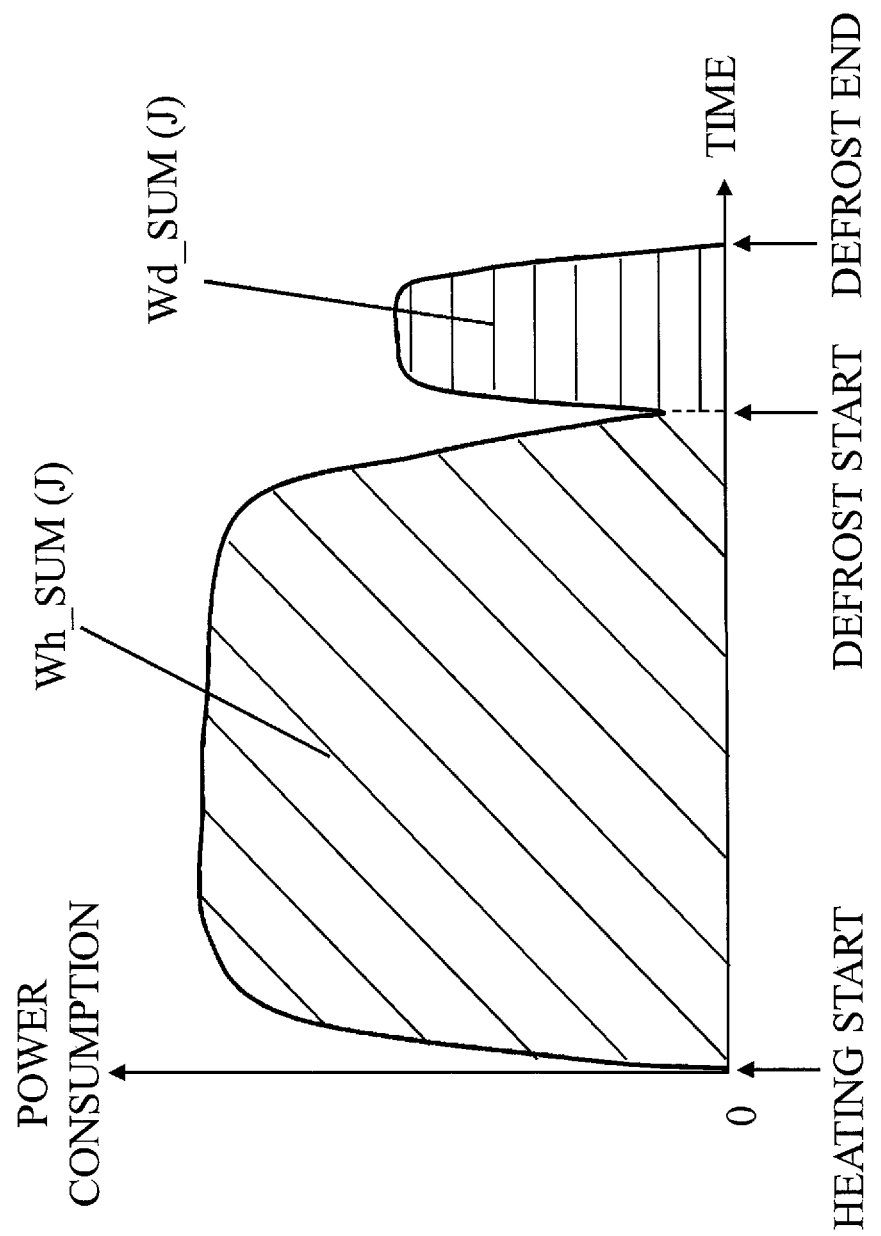
FIG. 5 is a diagram showing changes in power consumption from start of the heating operation to end of the defrost operation.

FIG. 4 is a diagram showing changes in performance from start of the heating operation to end of the defrost operation. FIG. 5 is a diagram showing changes in power consumption from start of the heating operation to end of the defrost operation.

Let Qh_SUM (J) be the total quantity of applied heat and Wh_SUM (J) be the total quantity of power consumption from start of the heating operation to start of defrosting (i.e., during the heating operation). Let Qd_SUM (J) be the total quantity of heat absorbed from the water and Wd_SUM (J) be the total quantity of power consumption during the defrost operation. Then, a cycle average COP is expressed by Equation 1, where a cycle is defined as a period from start of the heating operation to end of the defrost operation.

Cycle average $COP=(Qh\_SUM(J)-Qd\_SUM(J))/(Wh\_SUM(J)+Wd\_SUM(J))$ <Equation 1>

In Equation 1, the numerator is the total quantity of heat (J) applied to the water, so that the quantity of heat absorbed from the water during the defrost operation, Qd_SUM (J), is subtracted from the total quantity of applied heat during the heating operation, Qh_SUM (J).

The total quantity (J) of heat used for defrosting is expressed by Equation 2.

Total quantity(J) of heat used for defrosting=$Qd\_SUM(J)+Wd\_SUM(J)$ <Equation 2>

Figure 6:
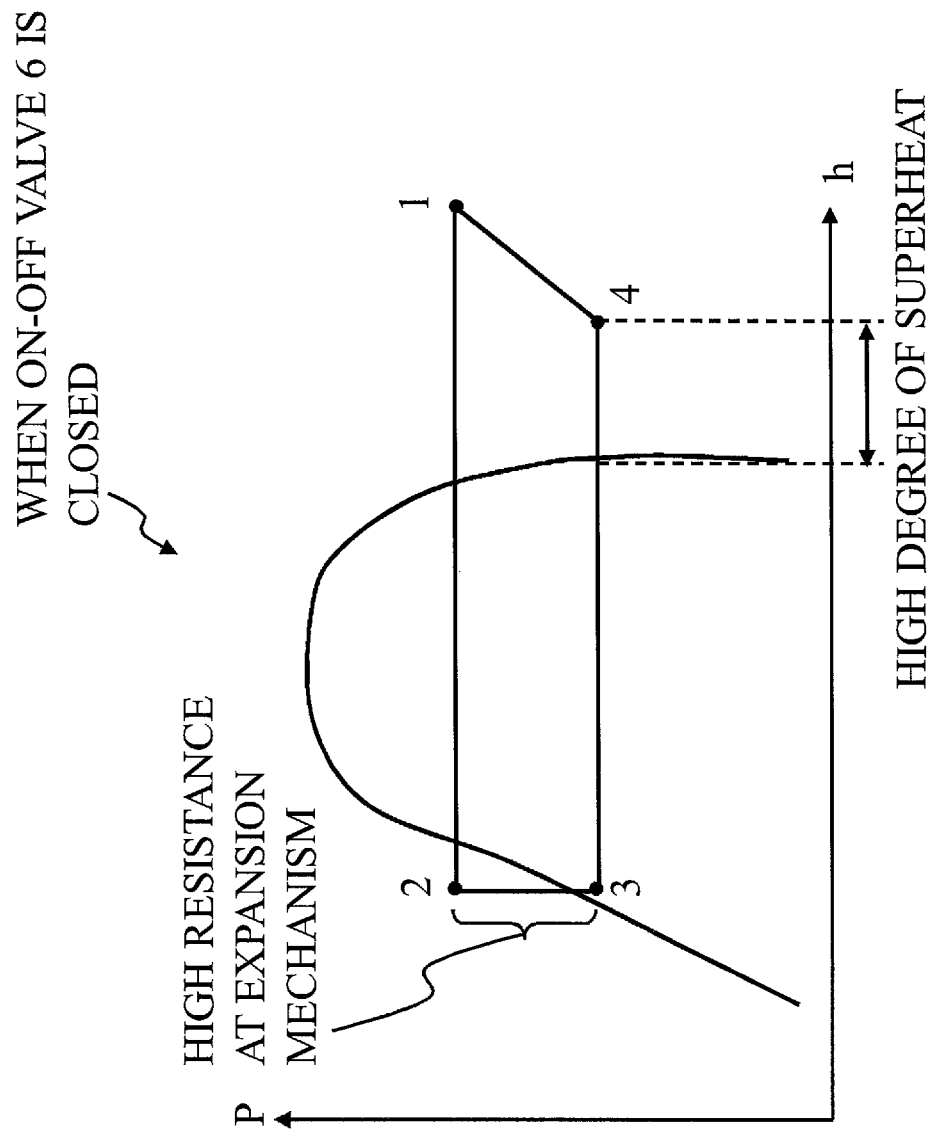
FIG. 6 is a Mollier diagram when the defrost operation is performed with an on-off valve 6 closed.

FIG. 6 is a Mollier diagram when the defrost operation is performed with the on-off valve 6 closed.

As shown in FIG. 6, when the defrost operation is performed with the on-off valve 6 closed, the refrigerant in a high-temperature and high-pressure gas state discharged from the compressor (point 1 in FIG. 6) radiates heat at the second heat exchanger 5, thereby melting the frost and condensing into a liquid refrigerant (point 2 in FIG. 6). The liquid refrigerant is pressure-reduced into a low-temperature and low-pressure gas-liquid two-phase refrigerant at the expansion mechanism 4 (point 3 in FIG. 6). The gas-liquid two-phase refrigerant absorbs heat from the water at the first heat exchanger 3, thereby turning into a low-pressure gas refrigerant (point 4 in FIG. 6), and then returns to the compressor 1.

In this case where the defrost operation is performed using the water as a heat source, a high resistance exists at the expansion mechanism 4 as indicated by a width between points 2 and 3 in the Mollier diagram shown in FIG. 6. For this reason, the circulation amount of the refrigerant is reduced relative to the quantity of heat absorbed from the water. As a result, the refrigerant that is drawn into the compressor 1 has a high degree of superheat (see FIG. 6). Thus, the temperature of the refrigerant when drawn into the compressor 1 becomes nearly as high as the temperature of the water, i.e. the heat source, causing a discharge temperature of the compressor 1 to rise.

When the discharge temperature of the compressor 1 rises, a difference between the temperatures of the discharged refrigerant and the air widens, thereby increasing the quantity of heat radiated from the refrigerant to the air. Let Q_min be the minimum quantity of heat required for defrosting, and Q_loss be the quantity of heat radiated to the air. Then, Equation 3 holds. The minimum quantity of heat required for defrosting, Q_min, is proportional to the amount of frost.

$Qd\_SUM(J)+Wd\_SUM(J)=Q\_min+Q\_loss$ <Equation 3>

That is, when the discharge temperature of the compressor 1 rises and the quantity of heat radiated to the air, Q_loss, increases, the total quantity of heat (J) used for defrosting, Qd_SUM (J)+Wd_SUM (J), also increases. This means that an increase occurs in both the quantity of heat absorbed from the water, Qd_SUM (J), and the total quantity of power consumption, Wd_SUM (J), during the defrost operation. That is, when the discharge temperature of the compressor 1 rises and the quantity of heat radiated to the air, Q_loss, increases, the cycle average COP shown in Equation 1 is reduced.

A loss of pressure at the expansion mechanism 4 also causes an increase in a compressor input, so that Wd_SUM (J) increases and the cycle average COP shown in Equation 1 is reduced.

Thus, upon start of the defrost operation, the control unit of the heat pump water heater according to the first embodiment opens the on-off valve 6 included in the bypass circuit 7, so that the refrigerant flows through the bypass circuit 7. At this time, if the expansion mechanism 4 is of a type that can be fully closed, the control unit may fully close the expansion mechanism 4.

Figure 7:
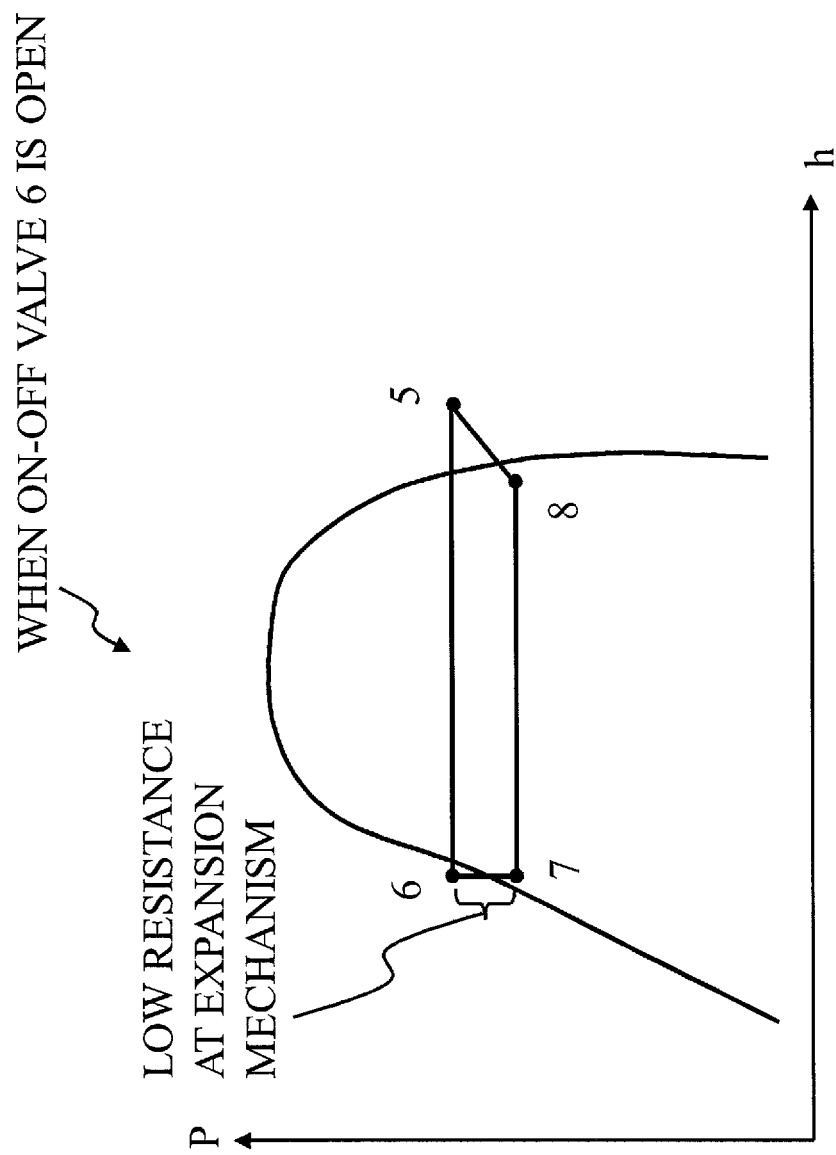
FIG. 7 is a Mollier diagram when the defrost operation is performed with the on-off valve 6 open.

FIG. 7 is a Mollier diagram when the defrost operation is performed with the on-off valve 6 open.

As shown in FIG. 7, when the defrost operation is performed with the on-off valve 6 open, the refrigerant in a high-temperature and high-pressure gas state discharged from the compressor 1 (point 5 in FIG. 7) radiates heat at the second heat exchanger 5, thereby melting the frost and condensing into a liquid refrigerant (point 6 in FIG. 7). The liquid refrigerant is pressure-reduced into a low-temperature and low-pressure gas-liquid two-phase refrigerant at the bypass circuit 7 (and the expansion mechanism 4) (point 7 in FIG. 7). The gas-liquid two-phase refrigerant absorbs heat from the water at the first heat exchanger 3 (point 8 in FIG. 7), and then returns to the compressor 1.

In this case, as can be seen by comparing FIGS. 6 and 7, by opening the on-off valve 6, the resistance at the expansion mechanism 4 is reduced (width between points 2 and 3 in FIG. 6>width between points 6 and 7 in FIG. 7), and the circulation amount of the refrigerant is increased. That is, by opening the on-off valve 6, the refrigerant flows through the bypass circuit 7, so that the circulation amount of the refrigerant is increased. This also reduces a difference between high and low pressures of the refrigerant in the heat pump water heater.

The circulation amount of the refrigerant is thus sufficiently secured, so that the degree of superheat of the suction refrigerant to the compressor 1 is reduced. Accordingly, the discharge temperature of the compressor 1 is prevented from rising, and the loss of heat radiation is reduced. That is, the quantity of heat radiated to the air, Q_loss, is reduced. The reduced difference between high and low pressures of the refrigerant also reduces the compressor input and Wd_SUM (J). Thus, the cycle average COP shown in Equation 1 is enhanced.

However, if the circulation amount of the refrigerant is too large for the quantity of heat taken from the water, the refrigerant in a gas-liquid two-phase state may return to the compressor 1. That is, a liquid backflow to the compressor 1 may occur.

In this case, the control unit changes the operating frequency of the compressor 1 to adjust the amount of heat exchange such that a degree of superheat SH of a suction refrigerant to the compressor 1 is adjusted to an appropriate value. The degree of superheat SH of the suction refrigerant is a difference between a temperature detected by the second temperature detection unit 11 and a temperature detected by the first temperature detection unit 10.

Specifically, when a liquid backflow occurs, the control unit lowers the operating frequency of the compressor 1 so as to reduce the amount of heat exchange, thereby increasing the degree of superheat SH of the suction refrigerant. By adjusting the degree of superheat SH of the suction refrigerant by lowering the operating frequency of the compressor 1, not only a liquid backflow is prevented, but also the compressor input is reduced.

As described above, by increasing the circulation amount of the refrigerant and by reducing the operating frequency of the compressor 1 to control the degree of superheat SH of the suction refrigerant to an appropriate value, the loss of heat radiation is prevented and the compressor input is reduced. As a result, the cycle average COP shown in Equation 1 can be enhanced.

The degree of superheat SH of the suction refrigerant that is appropriate is determined according to a heating load. The heating load is the quantity of heat required for heating. That is, the heating load herein is the quantity of heat required for heating the water by the first heat exchanger 3.

The heating load is computed (estimated) based on an operational situation during the heating operation. For example, the heating load is computed by a value obtained by dividing the total number of revolutions of the compressor 1 during the heating operation by the heating operation time.

Figure 8:
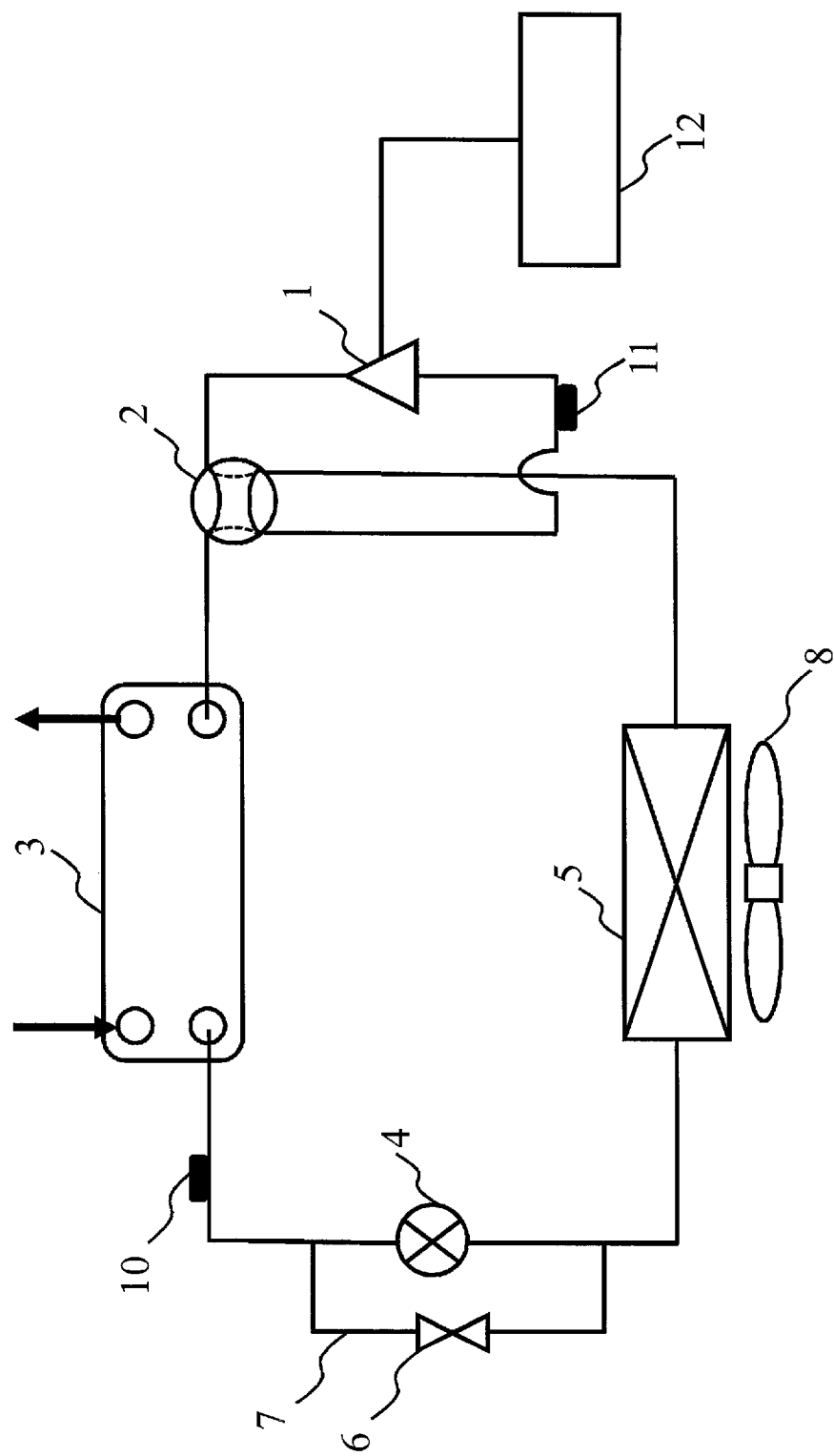
FIG. 8 is a configuration diagram of a refrigerant circuit of a heat pump water heater according to the first embodiment capable of calculating a heating load.

FIG. 8 shows a configuration diagram of a refrigerant circuit of a heat pump water heater capable of computing the heating load.

The heat pump water heater shown in FIG. 8 includes a compressor frequency detection unit 12 in addition to the heat pump water heater shown in FIG. 1. Other components are the same as those of the heat pump water heater shown in FIG. 1. The compressor frequency detection unit 12 is connected to the compressor 1, and detects the operating frequency of the compressor 1. Thus, the compressor frequency detection unit 12 can detect the total number of revolutions of the compressor 1 during the heating operation.

That is, the control unit can compute the heating load based on the total number of revolutions of the compressor 1 during the heating operation detected by the compressor frequency detection unit 12 and the heating operation time. The heating operation time can be obtained by measurement by a timer (a time measurement unit) included in the heat pump water heater.

Figure 9:
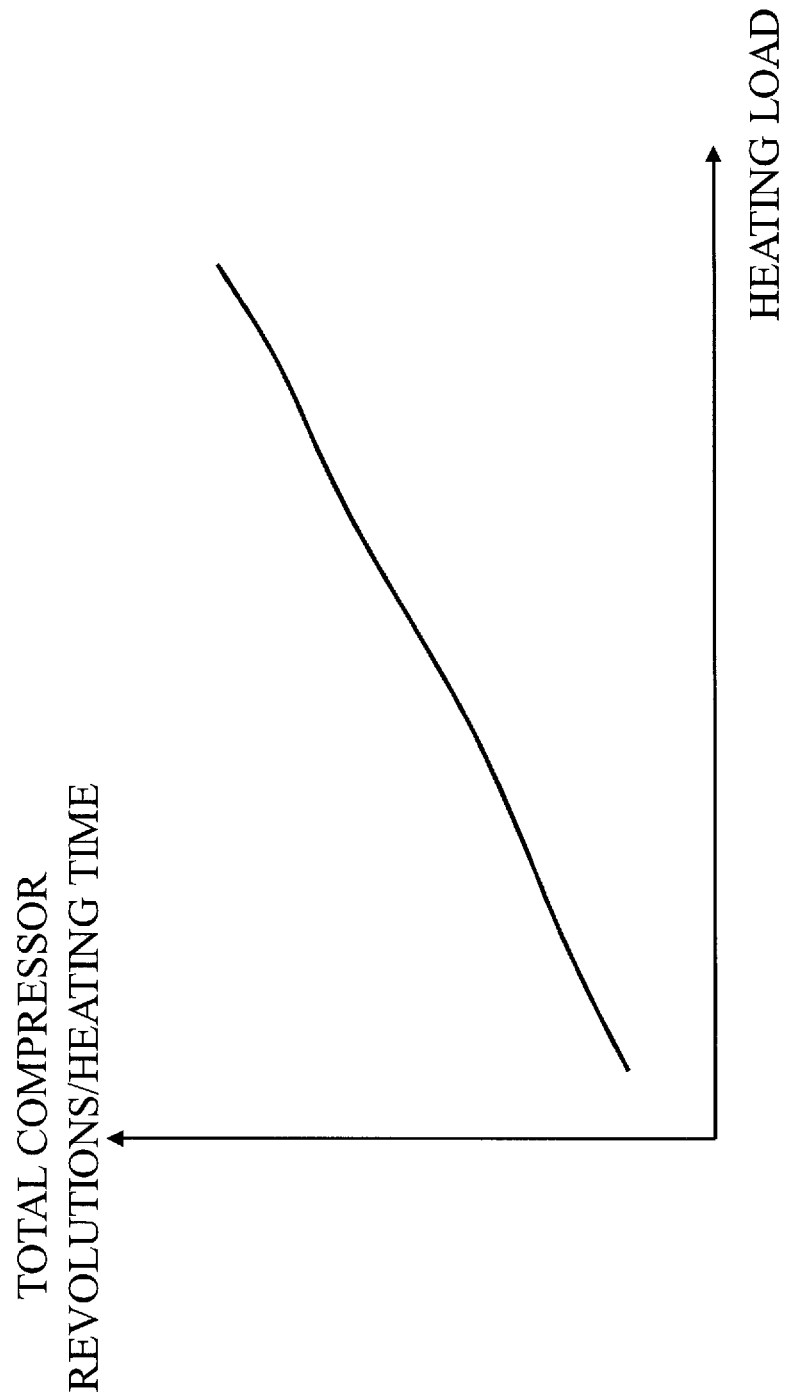
FIG. 9 is a diagram showing a relationship between the heating load and total compressor revolutions/heating operation time.

FIG. 9 is a diagram showing a relationship between the heating load and the total compressor revolutions/the heating operation time.

As shown in FIG. 9, the relationship between the heating load and the total compressor revolutions/the heating operation time is such that the greater the heating load, the greater the total compressor revolutions/the heating operation time, and the smaller the heating load, the smaller the total compressor revolutions/the heating operation time.

For example, when the heating load is greater than a predetermined value (when the heating load is high), it is necessary to complete defrosting quickly and perform the heating operation promptly. Thus, the control unit sets a small value such as, for example, 3 [K] as a target value for the degree of superheat SH of the suction refrigerant, and operates the compressor 1 at a relatively high operating frequency. With this arrangement, defrosting capability Qd (W) increases and defrosting can be completed in a short period of time.

On the other hand, when the heating load is not greater than the predetermined value (when the heating load is low), there is no need to return to the heating operation promptly. Thus, the control unit controls the defrost operation such that power consumption can be reduced at the expense of increased operation time. The lower the operating frequency of the compressor 1 during the defrost operation, the further the defrosting capability Qd (W) is reduced and the longer the defrost operation takes, but the further the compressor input is reduced. That is, the lower the operating frequency of the compressor 1 during the defrost operation, the lower the total power consumption during the defrost operation, Wd_SUM (J). Accordingly, when the heating load is smaller than the predetermined value, further energy saving can be obtained, for example, by lowering the operating frequency of the compressor 1 by setting the target value for the degree of superheat SH of the suction refrigerant such that the temperature of the refrigerant detected by the second temperature detection unit 11 corresponds to the temperature of the water.

In the above description, the compressor 1 is operated at a high operating frequency when the heating load is greater than the predetermined value, and the compressor 1 is operated at a low operating frequency when the heating load is not greater than the predetermined value. However, it may be such that the higher the heating load, the higher the operating frequency of the compressor 1, and the lower the heating load, the lower the operating frequency of the compressor 1.

Figure 10:
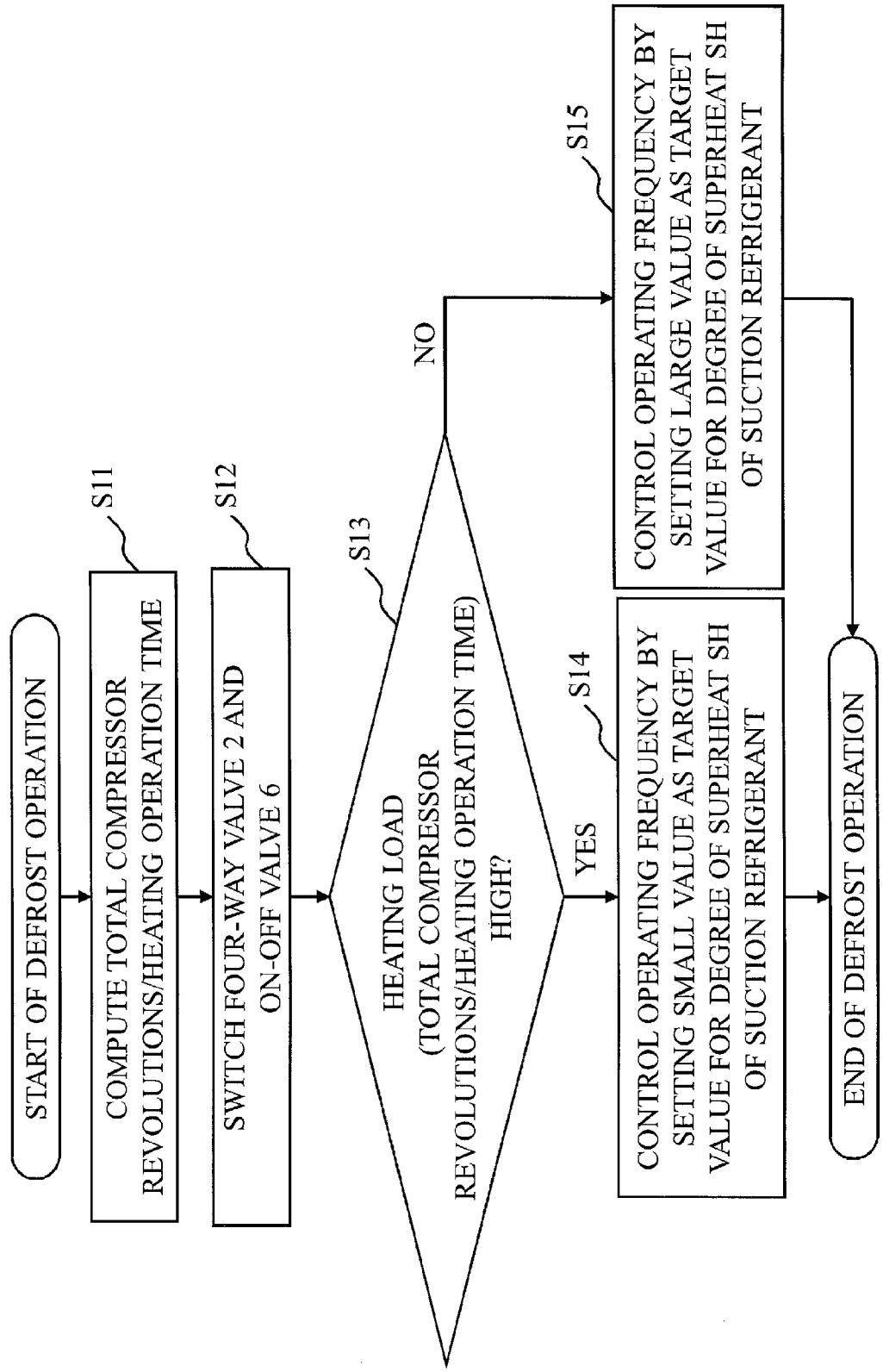
FIG. 10 is a flowchart showing control operations by a control unit when the heating operation is switched to the defrost operation.

FIG. 10 is a flowchart showing control operations by the control unit when the heating operation is switched to the defrost operation in the heat pump water heater according to the first embodiment.

In (S11), upon start of the defrost operation, the control unit computes the total compressor revolutions/the heating operation time, i.e., the heating load.

In (S12), the control unit switches the four-way valve 2 and the on-off valve 6. That is, the control unit switches the four-way valve 2 such that the refrigerant circulates in a reverse order as compared to the heating operation, and also opens the on-off valve 6. At the same time, the control unit may fully close the expansion mechanism 4.

In (S13), it is determined whether or not the heating load computed in (S11) is greater than a predetermined value. If the heating load is greater than the predetermined value (YES in S13), processing proceeds to (S14). On the other hand, if the heating load is not greater than the predetermined value (NO in S13), processing proceeds to (S15).

In (S14), the control unit sets a small value (3 [K], for example) as the target value for the degree of superheat SH of the suction refrigerant, and operates the heat pump water heater at a high operating frequency until the defrost operation is completed such that the target degree of superheat SH of the suction refrigerant is achieved.

In (S15), the control unit sets a large value as the target value for the degree of superheat SH of the suction refrigerant, and operates the heat pump water heater at a low operating frequency until the defrost operation is completed such that the target degree of superheat SH of the suction refrigerant is achieved.

As described above, in the heat pump water heater according to the first embodiment, during the defrost operation, the circulation amount of the refrigerant is increased, and the operating frequency of the compressor 1 is controlled depending on the heating load. As a result, a highly efficient defrost operation can be performed.

In the above description, the bypass circuit 7 is provided for improving a loss of pressure at the expansion mechanism 4. However, it may not be necessary to provide the bypass circuit 7 if the circulation amount of the refrigerant can be sufficiently secured without the bypass circuit 7, such as by enlarging a valve opening area of the expansion mechanism 4 when fully opened. That is, in this case, it may be arranged such that the circulation amount of the refrigerant is increased by making an opening degree of the expansion mechanism 4 wider during the defrost operation than during the heating operation.

In the above description, the second temperature detection unit 11 is provided at a suction portion of the compressor 1. The second temperature detection unit 11, however, may be provided at a refrigerant outlet portion of the first heat exchanger 3 during the defrost operation.

In the above description, the heating load is computed by a value obtained by dividing the total compressor revolutions by the heating operation time. However, if the heating load can be determined by any other method, that method may be used.

In the above description, the heat pump water heater is described as an example of the heat pump apparatus. However, provided that a sufficient quantity of heat can be secured for the defrost operation, the heat pump apparatus is not limited to the heat pump water heater, but may be other types of heat pump apparatus such as a heat pump air conditioner.

When the heat pump apparatus is a heat pump air conditioner, the first heat exchanger 3 is provided in a so-called indoor unit for heat exchange between a refrigerant and air.

Second Embodiment

Figure 11:
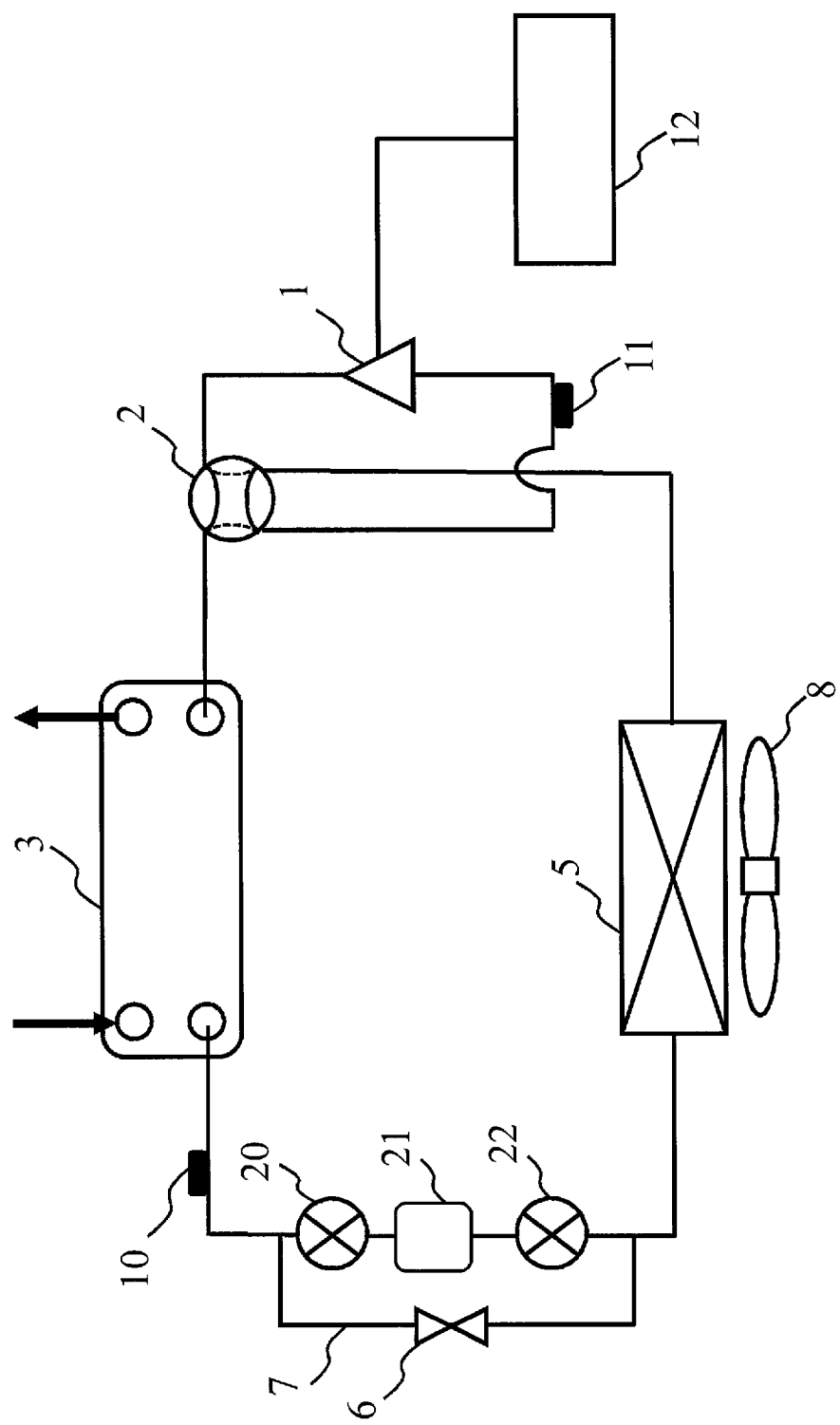
FIG. 11 is a configuration diagram of a refrigerant circuit of a heat pump water heater according to a second embodiment.
Figure 12:
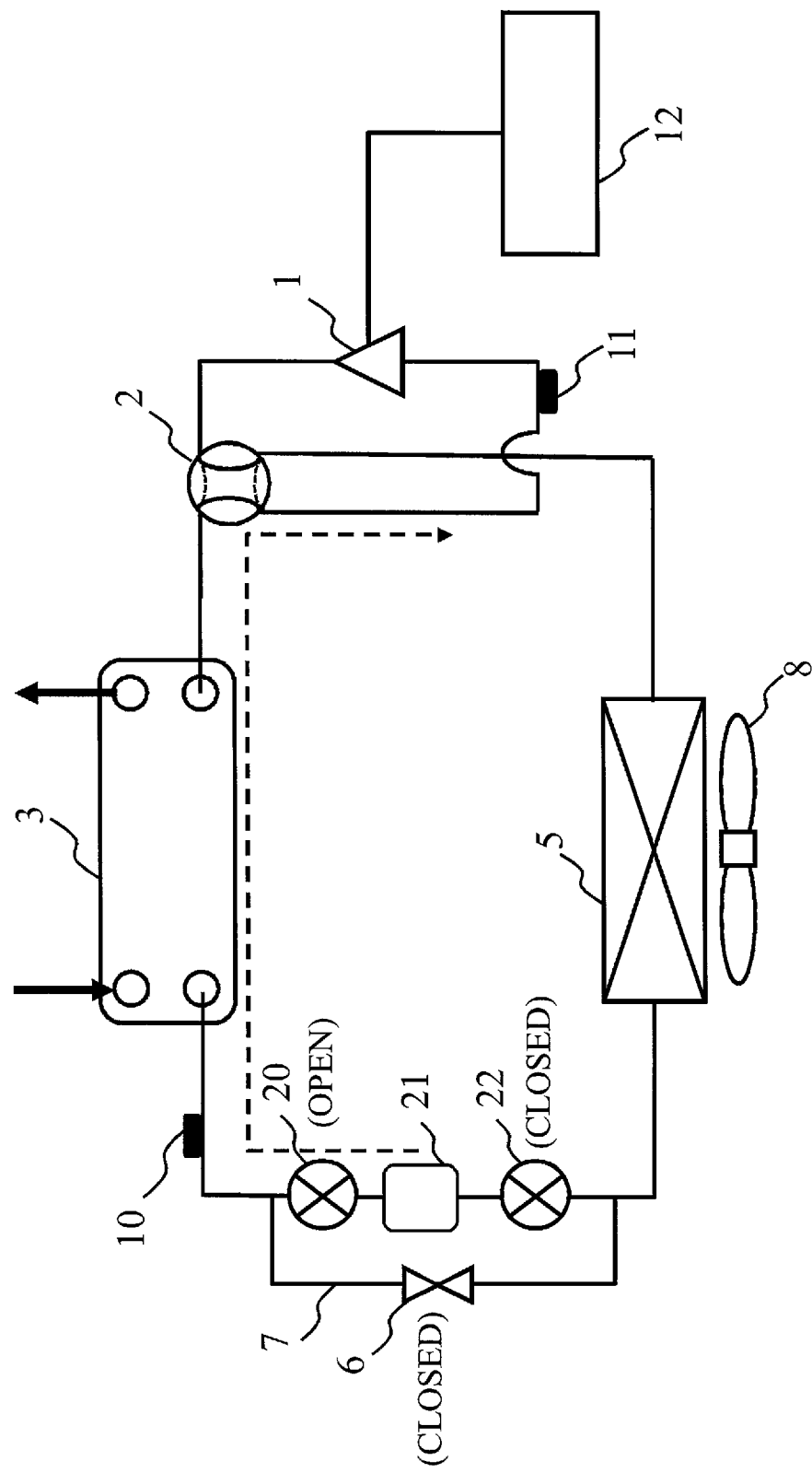
FIG. 12 is a diagram showing flows of the refrigerant in the refrigerant circuit shown in FIG. 11 when the heating operation is switched to the defrost operation.
Figure 13:
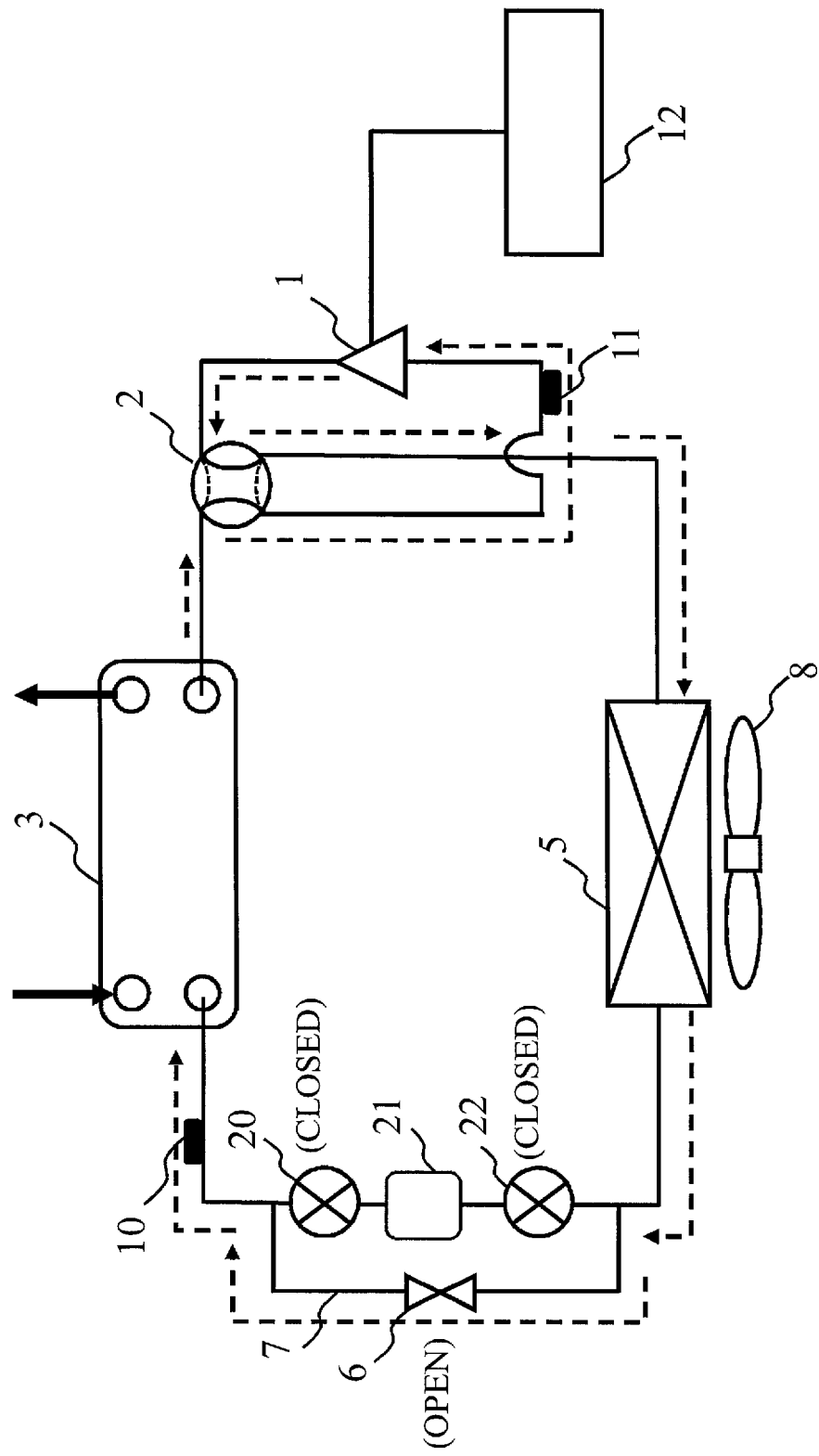
FIG. 13 is a diagram showing flows of the refrigerant in the refrigerant circuit shown in FIG. 11 when a predetermined period of time has elapsed after switching to the defrost operation.
Figure 14:
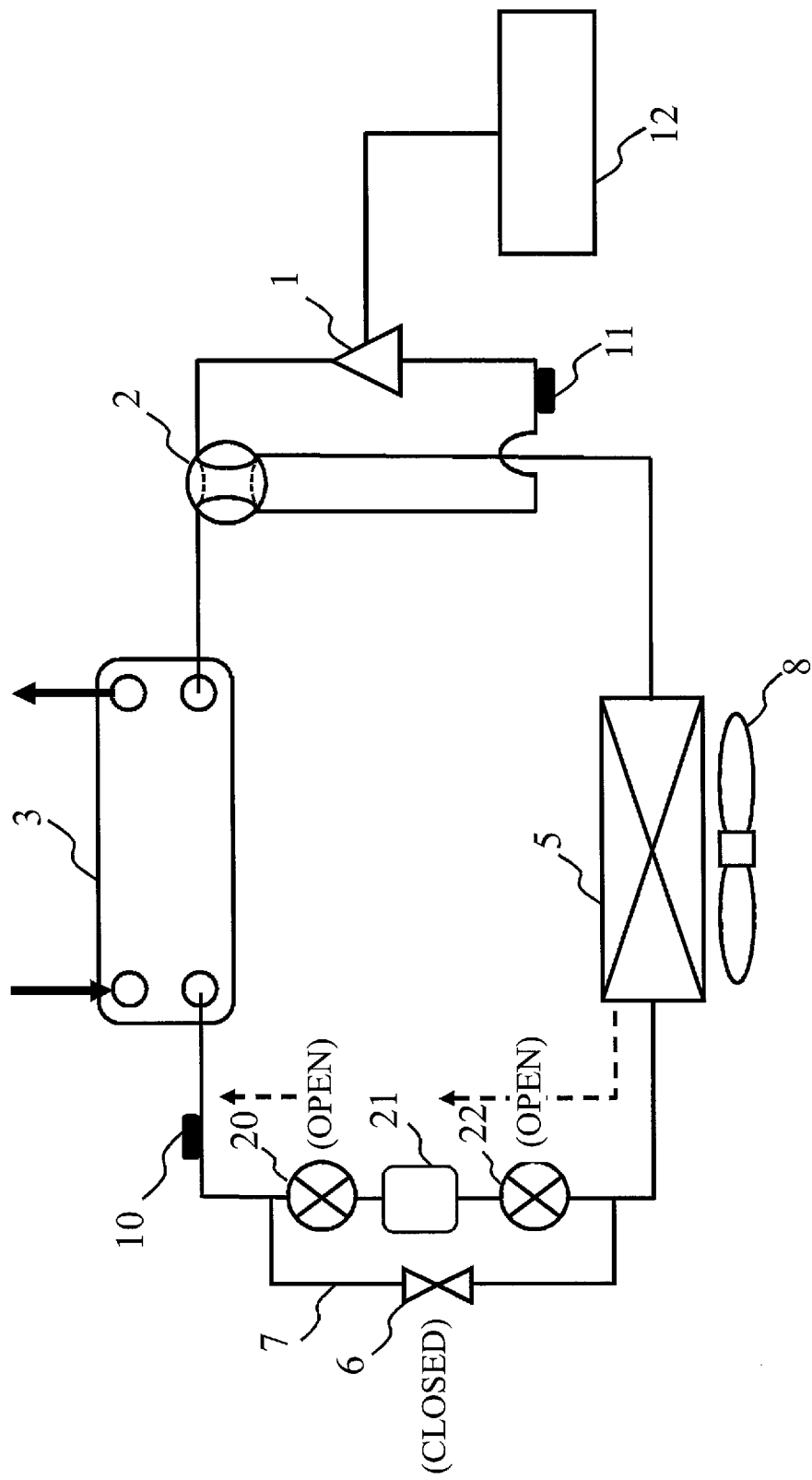
FIG. 14 is a diagram showing flows of the refrigerant in the refrigerant circuit shown in FIG. 11 when the defrost operation is switched to the heating operation.

FIG. 11 is a configuration diagram of a refrigerant circuit of a heat pump water heater according to a second embodiment. FIG. 12 is a diagram showing flows of a refrigerant in the refrigerant circuit shown in FIG. 11 when the heating operation is switched to the defrost operation. FIG. 13 is a diagram showing flows of the refrigerant in the refrigerant circuit shown in FIG. 11 when a predetermined period of time has elapsed after switching to the defrost operation. FIG. 14 is a diagram showing flows of the refrigerant in the refrigerant circuit shown in FIG. 11 when the defrost operation is switched to the heating operation. In FIGS. 12 to 14, a dashed arrow indicates a flow of the refrigerant, and a solid arrow indicates a flow of water.

A description of the refrigerant circuit of the heat pump water heater according to the second embodiment shown in FIG. 11 will be directed only to differences from the refrigerant circuit of the heat pump water heater according to the first embodiment shown in FIG. 1.

In the heat pump water heater according to the second embodiment, the expansion mechanism 4 in the heat pump water heater according to the first embodiment is configured with a first expansion mechanism 20, a liquid accumulator 21, and a second expansion mechanism 22. That is, a main refrigerant circuit of the heat pump water heater according to the second embodiment is formed by the compressor 1, the first heat exchanger 3, the first expansion mechanism 20, the liquid accumulator 21, the second expansion mechanism 22, and the second heat exchanger 5 connected sequentially.

The bypass circuit 7 connects a midpoint between the first heat exchanger 3 and the first expansion mechanism 20 with a midpoint between the second expansion mechanism 22 and the second heat exchanger 5 such that the first expansion mechanism 20, the liquid accumulator 21, and the second expansion mechanism 22 are bypassed.

Further, the first temperature detection unit 10 is provided between the first heat exchanger 3 and the first expansion mechanism 20, and the second temperature detection unit 11 is provided between the four-way valve 2 and the compressor 1. In particular, the first temperature detection unit 10 is provided between the first heat exchanger 3 and a connection point of the bypass circuit 7 between the first heat exchanger 3 and the first expansion mechanism 20.

As shown in FIG. 12, when the heating operation is switched to the defrost operation, the control unit opens (fully opens) the first expansion mechanism 20, closes (fully closes) the second expansion mechanism 22, closes the on-off valve 6, and sets the four-way valve 2 in the same manner as for the defrost operation in the first embodiment. The heat pump water heater is operated in this state for a predetermined period of time. With this arrangement, the refrigerant accumulated in the liquid accumulator 21 is taken out so as to increase the circulation amount of the refrigerant.

When the predetermined period of time has elapsed after switching to the defrost operation, that is, after the refrigerant accumulated in the liquid accumulator 21 has been taken out, the control unit closes (fully closes) the first expansion mechanism 20 and opens the on-off valve 6, as shown in FIG. 13. That is, the control unit closes (fully closes) the first expansion mechanism 20, closes (fully closes) the second expansion mechanism 22, opens the on-off valve 6, and sets the four-way valve 2 in the same manner as for the defrost operation in the first embodiment. The heat pump water heater is operated in this state until switched to the heating operation.

As shown in FIG. 14, when the defrost operation is switched to the heating operation, the control unit closes the on-off valve 6 and then opens the first expansion mechanism 20 and the second expansion mechanism 22. That is, the control unit opens (fully opens) the first expansion mechanism 20, opens (fully opens) the second expansion mechanism 22, closes the on-off valve 6, and sets the four-way valve 2 in the same manner as for the defrost operation in the first embodiment. The heat pump water heater is operated in this state for a predetermined period of time. With this arrangement, the refrigerant is accumulated in the liquid accumulator 21. At this time, provided that the refrigerant can be accumulated in the liquid accumulator 21, the first expansion mechanism 20 may be fully closed.

Then, when the predetermined period of time has elapsed, that is, when the refrigerant has been accumulated in the liquid accumulator 21, the control unit sets the four-way valve 2 in the same manner as for the heating operation in the first embodiment so as to perform the heating operation.

Figure 15:
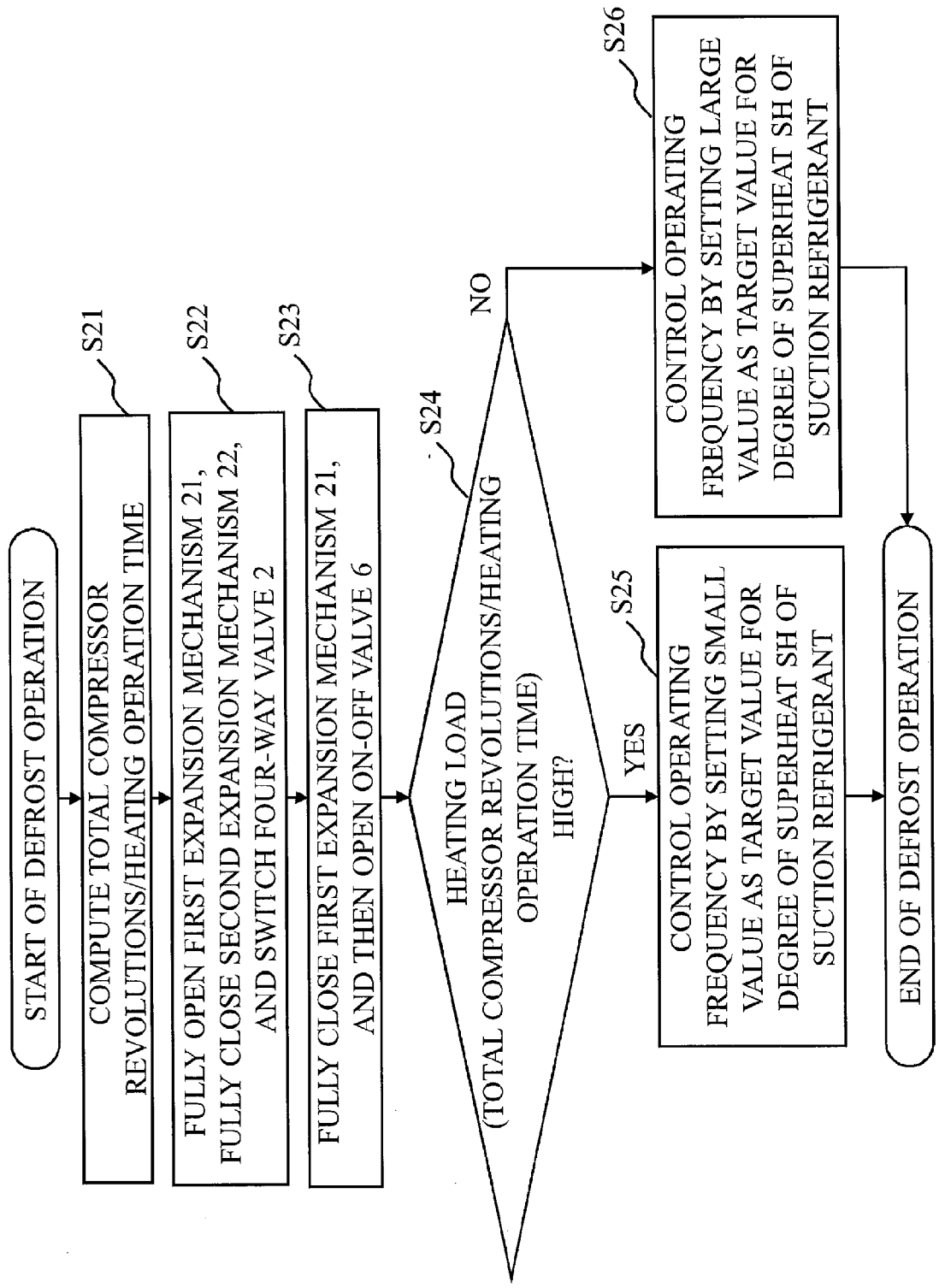
FIG. 15 is a flowchart showing control operations by the control unit when the heating operation is switched to the defrost operation in the heat pump water heater according to the second embodiment.

FIG. 15 is a flowchart showing control operations by the control unit when the heating operation is switched to the defrost operation in the heat pump water heater according to the second embodiment.

(S21) is the same as (S11) shown in FIG. 10.

In (S22), as shown in FIG. 12, the control unit opens (fully opens) the first expansion mechanism 20, closes (fully closes) the second expansion mechanism 22, closes the on-off valve 6, and sets the four-way valve 2 in the same manner as for the defrost operation in the first embodiment. Then, the refrigerant accumulated in the liquid accumulator 21 is taken out.

In (S23), after the refrigerant accumulated in the liquid accumulator 21 has been taken out, the control unit closes (fully closes) the first expansion mechanism 20 and opens the on-off valve 6, as shown in FIG. 13.

(S24) to (S26) are respectively the same as (S13) to (S15) shown in FIG. 10.

When the defrost operation is switched to the heating operation, the control unit closes the on-off valve 6 and then opens the first expansion mechanism 20 and the second expansion mechanism 22, as shown in FIG. 14. With this arrangement, the refrigerant is accumulated in the liquid accumulator 21. Then, the four-way valve 2 is switched to start the heating operation.

As described above, in the heat pump water heater according to the first embodiment, when the heating operation is resumed after the defrost operation, the amount of the liquid refrigerant accumulated in the second heat exchanger 5 during the defrost operation can be reduced. In this way, a liquid backflow can be prevented when the heating operation is resumed.

In the above description, the second temperature detection unit 11 is provided at a suction portion of the compressor 1. The second temperature detection unit 11, however, may be provided at a refrigerant outlet portion of the first heat exchanger 3 during the defrost operation.

In the above description, the heating load is computed by dividing the total compressor revolutions by the heating operation time. However, if the heating load can be determined by any other method, that method may be used.

In the above description, the heat pump water heater is described as an example of the heat pump apparatus. However, provided that a sufficient quantity of heat can be secured during the defrost operation, the heat pump apparatus is not limited to the heat pump water heater, and may be other types of heat pump apparatus such as a heat pump air conditioner.

When the heat pump apparatus is a heat pump air conditioner, the first heat exchanger 3 is provided in a so-called indoor unit for heat exchange between a refrigerant and air.

The above is summarized as follows:

The heat pump water heater according to the above embodiments has the main refrigerant circuit in which the compressor 1, the four-way valve 2, a water-refrigerant heat exchanger (the first heat exchanger 3), the expansion mechanism 4, and an air-refrigerant heat exchanger (the second heat exchanger 5) are connected sequentially. The main refrigerant circuit includes the bypass circuit 7 including the on-off valve 6 and connecting the water-refrigerant heat exchanger and the air-refrigerant heat exchanger in a bypassing manner, and also includes refrigerant superheat detection units (the first temperature detection unit 10, the second temperature detection unit 11) that detect the degree of superheat of the refrigerant evaporated at the water-refrigerant heat exchanger during the defrost operation for removing frost from the air-refrigerant heat exchanger. During the defrost operation, the on-off valve 6 is opened such that the refrigerant flows through the bypass circuit 7, and a compressor frequency is changed such that a value detected by the refrigerant superheat detection units is a predetermined target value.

The target value for the superheat of the refrigerant is changed depending on the heating load.

If the heating load is smaller than a predetermined value, the target value for the degree of superheat of the refrigerant is increased, and the compressor frequency is lowered during the defrost operation for prioritizing energy saving. If the heating load is greater than the predetermined value, the target value for the degree of superheat of the refrigerant is lowered, and the compressor frequency is raised for prioritizing performance.

The heat pump water heater includes the compressor frequency detection unit 12 for detecting the total compressor revolutions during the heating operation, and determines the heating load by dividing the total compressor revolutions by the heating operation time.

The expansion mechanism 4 is configured with the first expansion mechanism 20, the liquid accumulator 21, and the second expansion mechanism 22 connected sequentially.

At start of the defrost operation, the first expansion mechanism 20 is fully opened and the second expansion mechanism 22 is fully closed. After the refrigerant in the liquid accumulator 21 has been taken out, the first expansion mechanism 20 is fully closed and the on-off valve 6 included in the bypass circuit 7 is opened.

When heating is resumed, the on-off valve 6 is closed, and then the first expansion mechanism 20 and the second expansion mechanism 22 are fully opened. After the refrigerant has been accumulated in the liquid accumulator 21, the four-way valve 2 is switched.

REFERENCE SIGNS LIST

1: compressor, 2: four-way valve, 3: first heat exchanger, 3-1: refrigerant inlet, 3-2: refrigerant outlet, 3-3: fluid inlet, 3-4: fluid outlet, 4: expansion mechanism, 5: second heat exchanger, 6: on-off valve, 7: bypass circuit, 8: fan, 10: first temperature detection unit, 11: second temperature detection unit, 12: compressor frequency detection unit, 20: first expansion mechanism, 21: liquid accumulator, 22: second expansion mechanism

The invention claimed is:

1. A heat pump apparatus comprising:
    a refrigerant circuit in which a compressor, a first heat exchanger, a first expansion mechanism, a liquid accumulator, a second expansion mechanism, and a second heat exchanger are connected sequentially;
    a bypass circuit that includes an on-off valve, and connects a midpoint between the first heat exchanger and the first expansion mechanism with a midpoint between the second expansion mechanism and the second heat exchanger in the refrigerant circuit such that the first expansion mechanism, the liquid accumulator, and the second expansion mechanism are bypassed,
    a switching unit that switches a direction in which a refrigerant flows between a heating operation and a defrost operation, thereby switching between the heating operation and the defrost operation;
    a superheat detection unit that detects a degree of superheat of the refrigerant at the first heat exchanger during the defrost operation; and
    a control unit that, when the heating operation is switched to the defrost operation by the switching unit, closes the second expansion mechanism, and after a predetermined period of time has elapsed, closes the first expansion mechanism and opens the on-off valve included in the bypass circuit, thereby increasing a circulation amount of the refrigerant circulating through the refrigerant circuit, and controls an operating frequency of the compressor such that the degree of superheat detected by the superheat detection unit is at a target value which is predetermined.

2. The heat pump apparatus of claim 1,
    wherein the control unit changes the target value depending on a heating load which is a quantity of heat required for heating.

3. The heat pump apparatus of claim 2,
    wherein the control unit sets the target value such that the target value when the heating load is smaller than a predetermined value is larger compared to the target value when the heating load is greater than the predetermined value, so that the operating frequency of the compressor is lower when the heating load is smaller than the predetermined value compared to when the heating load is greater than the predetermined value.

4. The heat pump apparatus of claim 2, further comprising:
   a compressor frequency detection unit that detects a total number of revolutions of the compressor during the heating operation; and
   a time measurement unit that measures a heating operation time,
   wherein the control unit computes the heating load from a value obtained by dividing the total number of revolutions of the compressor during the heating operation detected by the compressor frequency detection unit by the heating operation time measured by the time measurement unit.

5. The heat pump apparatus of claim 1,
   wherein the control unit, when the defrost operation is switched to the heating operation, closes the on-off valve included in the bypass circuit and opens the first expansion mechanism and the second expansion mechanism, and after a predetermined period of time has elapsed, switches the direction in which the refrigerant flows by the switching unit.

* * * * *